United States Patent [19]

Jochem et al.

[11] Patent Number: 4,644,898
[45] Date of Patent: Feb. 24, 1987

[54] ARRANGEMENT FOR COATING OPTICAL FIBRES

[75] Inventors: Cornelis M. G. Jochem; Jacobus W. C. van der Ligt, both of Eindhoven, Netherlands

[73] Assignee: U.S. Philips Corporation, New York, N.Y.

[21] Appl. No.: 789,512

[22] Filed: Sep. 26, 1985

[30] Foreign Application Priority Data

Apr. 19, 1985 [NL] Netherlands .......................... 8501146

[51] Int. Cl.$^4$ .............................................. B05C 3/15
[52] U.S. Cl. .................... 118/405; 118/420; 118/429
[58] Field of Search ............... 118/405, 404, 420, 429; 427/163

[56] References Cited

U.S. PATENT DOCUMENTS

| 4,194,462 | 3/1980 | Knowles | 118/405 |
| 4,258,646 | 3/1981 | Kloczewski et al. | 118/405 X |
| 4,409,263 | 10/1983 | Aloisio, Jr. et al. | 118/405 X |

Primary Examiner—John P. McIntosh
Attorney, Agent, or Firm—Norman N. Spain

[57] ABSTRACT

An arrangement for coating a fibre, more particularly an optical fibre, comprising a housing (31) with a pressure chamber (61) which is in communication with a connection (63) for the supply of liquid coating material. A fibre to be coated is supplied via a guide duct (59) in a tubular guide member (55), traverses the pressure chamber (61) and leaves the device (11) via an outlet opening (41) in a nozzle (40). The tubular guide member (55) is made of an elastically deformable material. By means of two spindles (79), the end of the tubular guide member (55) can be adjusted so that the coating is centered with respect to the fibre and a coaxial location of fibre and coating is obtained.

9 Claims, 5 Drawing Figures

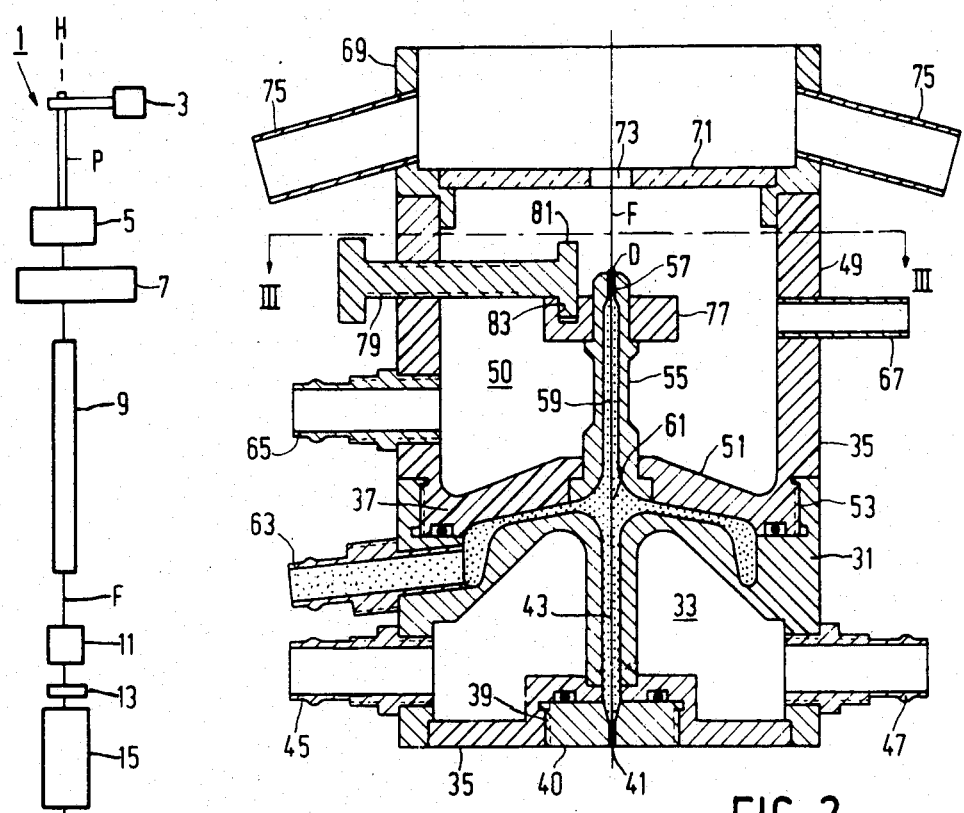
FIG. 2
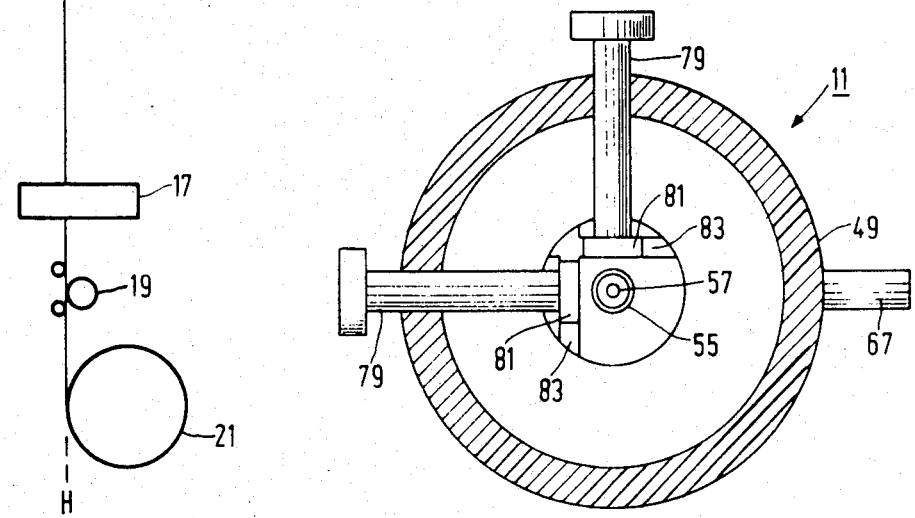
FIG. 1
FIG. 3

ARRANGEMENT FOR COATING OPTICAL FIBRES

The invention relates to an arrangement for coating optical fibres comprising a housing with a pressure chamber, a nozzle with an outlet opening, a closure part which closes the pressure chamber on the upper side and has a guide duct with an inlet opening for the supply and guidance of a fibre to be coated, a supply opening in the wall of the housing for the supply of liquid coating material and an overflow opening in the sidewall of the housing.

Fibres are frequently provided with a coating for protection against mechanical damage, for insulation, for coding purposes and for other applications. Thus, for example, glass fibres, which are used for optical communication, should be covered with a protective coating immediately after the manufacture after having been drawn out of a crucible or from a preform. Since glass is a brittle material, the strength and the mechanical reliability of the fibre in the long run strongly depends upon the quality of the surface of the fibre. Scratches, haircracks and dust particles on the surface of the fibre are not allowed. In order to obtain a fibre with a flawless surface, the temperature and gas conditions in the drawing furnace or crucible have to be carefully chosen. In order to maintain this perfect surface of the fibre once obtained, the fibre has to be coated with a protective layer. This has to take place in a continuous process before the fibre gets into contact in some manner or other with some object. Dust-free conditions before the fibre is coated are of major importance. The coating material, mostly a polymeric synthetic material, is applied in the liquid state and is subsequently cured thermally or by means of ultraviolet light. The coating may consist of a single layer of synthetic material or of two protective layers; in the case of a double-layer coating, two layers of synthetic material may be applied or a first layer of a comparatively soft material, such as silicone rubber or a hot-melt wax, and a second layer of synthetic material may be applied. It is usual to apply to a frequently used standard glass fibre having a diameter of 125 $\mu$m a coating having a thickness varying from 25 to 60 $\mu$m. In principle, a glass fibre is provided with a coating by passing the fibre through a container filled with liquid coating material and by drawing it through the outlet opening of a nozzle. The coating should be applied coaxially or concentrically with respect to the fibre, in other words: the thickness of the coating should be constant, viewed along the circumference of the fibre. A fibre having a non-concentric coating is subjected to asymmetrical forces during cooling or heating. These asymmetrical forces are due to unequal expansion coefficients of fibre material and coating material and may result in undesirable variations of the optical properties of the fibre. Moreover, the fibre may be insufficiently protected over a part of the circumference. The concentric location of fibre and coating is continuously measured by means of a control device. An error in the concentricity must be readjusted or eliminated.

Another example of a fibre that has to be provided with a coating is copper winding wire. The diameter of the winding wire used in practice generally varies from 20 $\mu$m to 1250 $\mu$m. This wire has applied to it an electrically insulating coating consisting of a lacquer layer whose thickness increases from 4 $\mu$m for a wire having a diameter of 20 $\mu$m to 60 $\mu$m for a wire having a diameter of 1250 $\mu$m. In view of the comparatively small thickness of the coating, a concentric coating is absolutely required for fibres of this kind.

U.S. Pat. No. 4,374,161 discloses an arrangement for coating optical fibres comprising means for the accurate adjustment of the arrangement in the x and y direction in order to eliminate any errors in the relative concentric location of fibre and coating and to centre fibre and coating with respect to each other. This manner of centering, i.e. by adjustment of the whole unit, requires comparatively large displacements of the order of millimeters and imposes stringent requirements on the shape of the outlet opening in the nozzle; the latter has to exert a centering effect on the fibre; when the dimensions of the outlet opening have slightly changed, for example by wear, this method is no longer effective. The coating device forms part of a drawing equipment and is arranged so that the centre line of the arrangement coincides with the centre line of the drawing equipment. When now the whole housing of the coating device is displaced in the x-y direction, the centre lines of the arrangement and of the drawing equipment no longer coincide, as a result of which the fibre is also displaced out of the centre line of the drawing equipment.

Such possible displacements have to be taken into account in the unit of the drawing equipment which adjoins the coating device, i.e. the curing equipment. The inlet opening of this equipment should have such large dimensions that the fibre, even if it no longer extends in the centre line of the drawing equipment, cannot touch the edge of the opening. A large inlet opening of the curing equipment has the disadvantage that oxygen can enter more readily, which is unfavourable for a rapid curing process.

Moreover, a fibre which does not follow the centre line of the curing equipment is not heated radial-symmetrically so that transport of the liquid coating material occurs on the fibre and the concentrically applied coating becomes non-concentric after all (Marangoni effect).

If the adjoining unit of the drawing equipment is a second coating device, which is the case if a double-layer coating is applied to the fibre, after an x-y displacement of one coating device the other coating device should also be adjusted in the x-y direction.

An arrangement of the kind mentioned in the opening paragraph is known from U.S. Pat. No. 4,409,263; in this known arrangement, the aforementioned disadvantages are avoided; for this purpose, the arrangement is provided with two nozzles each having a restricted opening, the liquid coating material is supplied under pressure; the fibre to be coated is centred in the two nozzles. Any non-concentric location of fibre and coating cannot be readjusted or eliminated.

The invention has for its object to provide an arrangement for coating fibres, by which deviations in the relative coaxial location of fibre and coating can be readjusted and eliminated in a simple and reproducible manner.

According to the invention, this object is mainly achieved in that the guide duct is provided in a tubular guide member, which is secured on the closure part and at least the free end of which is adjustable in radial direction.

Coating and fibre can be centred with respect to each other solely by adjustment of the free end of the tubular guide member. Deviations in the concentricity of fibre and coating can indeed be eliminated on the one hand, while on the other hand not the whole housing has to be adjusted. The centre line of the outlet opening in the nozzle continues to coincide with the centre line of the drawing equipment so that the fibre continues to follow the centre line of the drawing equipment. The inlet opening of the curing equipment can have minimum dimensions without the risk of contact with the fibre. A narrow inlet opening is advantageous with a view to the removal of oxygen from the curing equipment, which is necessary for a rapid curing process. It has been found in practice that minimum displacements of the end of the tubular guide member, i.e. displacements of the order of 0.5 mm, are sufficient to compensate for occuring deviations in the concentricity of fibre and coating.

The coated fibre follows the centre line of the curing device so that coating and fibre are heated radial-symmetrically. If the drawing equipment comprises two coating devices for applying a double-layer coating to the fibre, an adjustment of one coating device does not automatically require an adjustment of the other coating device.

It should be noted that U.S. Pat. No. 4,116,654 discloses an arrangement for coating optical fibres provided with an adjustable rigid guide tube, which is adjusted so that a coating of uniform layer thickness is obtained. Since during the adjustment both the inlet opening and the outlet opening of the guide tube are displaced, there is a risk also in this case that the fibre and/or the outlet opening are located outside the centre line of the drawing equipment.

Since in a preferred embodiment of the arrangement according to the invention the inlet opening of the guide duct is restricted, a centering effect is exerted on the fibre in the inlet opening during the process of coating the fibre, as a result of which the correct positioning during adjustment is facilited.

In another preferred embodiment of the arrangement according to the invention, the tubular guide member is made of an elastically deformable material. Due to this measure, the desired adjustment can take place solely by a slight elastic deformation of the tubular guide member. This construction is not susceptible to wear and is free of clearance.

A further preferred embodiment of the arrangement according to the invention is characterized in that the tubular guide member is made of polytetrafluoroethylene. This material is wear-resistant, can be easily machined and is not wetted by the liquid coating material, which favours the application of a concentric and bubble-free coating to the fibre.

The tubular guide member can be adjusted by means of a known conventional adjustment mechanism mainly comprising three adjustment screws which are uniformly distributed over the circumference of the tubular guide member and cooperate with the free end of the guide member.

However, in another preferred embodiment of the arrangement according to the invention, a simpler adjustment can be obtained in that there is arranged on the free end of the tubular guide member an adjustment block provided with two guide grooves which are arranged at right angles to each other and cooperate with two disk-shaped members, which are arranged on the ends of two spindles which are arranged at right angles to each other and are adjustable by means of a screw connection in the wall of the housing. Due to these constructional measures, two adjustment members are sufficient, i.e. the two spindles, so that an accurate adjustment can take place more rapidly and more precisely than in the conventional adjustment mechanism comprising three adjustment members.

Due to the fact that in a further preferred embodiment of the arrangement according to the invention the nozzle is in communication with the pressure chamber via a narrowed outlet duct, a centering effect is exerted on the fibre during its passage through the outlet duct, as a result of which the whole centering is stabilized.

Another preferred embodiment of the arrangement according to the invention is characterized in that the housing has a circulation chamber which surrounds the part of the pressure chamber facing the outlet opening. By regulating the temperature of the water flowing through the circulation chamber, the temperature and hence the viscosity of the coating material present in the pressure chamber can be influenced directly and rapidly in such a manner that the layer thickness of the applied coating remains constant.

Experiments have shown that by means of the arrangement according to the invention a fibre can be provided with a concentric coating within narrow tolerances in a reproducible manner, that is to say over lengths of kilometers, and at high speeds up to 700 m/min. In case any deviations might occur, the concentricity of fibre and coating can be restored by a suitable adjustment of the tubular guide member.

As has already been explained, a concentric coating is particularly of importance for optical glass fibres and for copper winding wire. Of course, the arrangement according to the invention can be used with equal advantage for coating fibres of a different composition, for example fibres of synthetic material, carbon fibres, metal fibres in general, etc.

The invention will be described more fully with reference to the drawing. In the drawing:

FIG. 1 shows diagrammatically an equipment for drawing optical fibres;

FIG. 2 is a longitudinal sectional view of an arrangement according to the invention for coating fibres;

FIG. 3 shows the arrangement in cross-section taken on the line III—III in FIG. 2;

Figure 4:
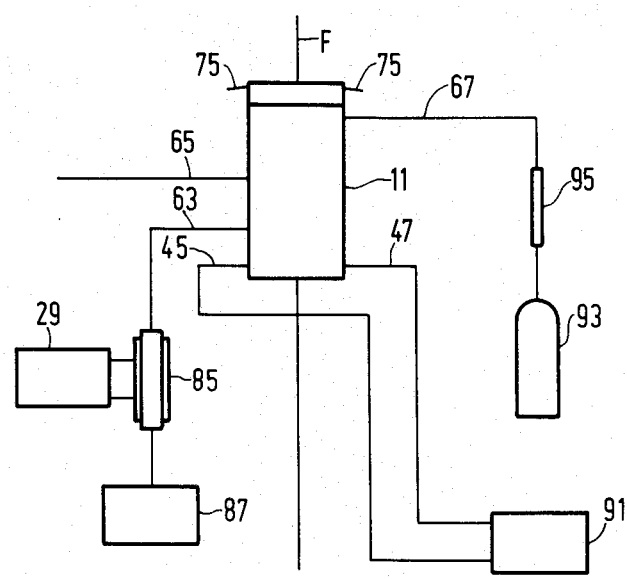
FIG. 4 shows diagrammatically the regulation device for the supply of gas and of coating material.

The invention will be explained with reference to an embodiment for coating an optical fibre. For this purpose, the known equipment 1 shown diagrammatically in FIG. 1 is used, which comprises a holder 3 for a preform P, a drawing furnace 5, a measurement device 7 for measuring the fibre diameter, a cooling device 9, a coating device 11 for applying a coating, a control device 13 for controlling the concentric location of fibre and coating, a curing device 15, a measurement device 17 for measuring the diameter of the coated fibre, a tension meter 19 for measuring the tensile force and a drawing device which in the embodiment shown is in the form of a take-up reel 21. A curing device operating with UV light is used for the frequently employed UV-curing coating material.

The drawing furnace 5, the measurement device 7 and 17, the cooling device 9, the control device 13 and the curing device 15 may have a known construction and do not lie within the scope of the invention.

This equipment 1 is used in known manner as follows. By heating in the drawing furnace 5, a fibre F is drawn from a preform P, the draw speed being regulated via the diameter measurement device 7 in a manner such that the diameter of the fibre F is as constant as possible. The fibre F is cooled in the cooling device 9 to a temperature at which a coating of synthetic material can be applied. The fibre is coated in the coating device 11. After the coated fibre has been controlled in the control device 13 as to the correct concentric location of fibre and coating, the fibre F is passed through the curing device 15 for curing the coating. The diameter of the coating fibre is measured in the diameter measurement device 17, while the tensile force is measured in the tension meter 19. The finished fibre is wound onto the reel 21 which ensures that the fibre F is transported through the equipment 1.

FIGS. 2 and 3 show an embodiment according to the invention of the coating device 11. The device 11 is of the so-called closed type with supply of the coating material under pressure and comprises for this purpose a housing 31 with a circulation chamber 33 and provided with a bottom part 35 and a closure part 37. By means of a screw connection 39, a nozzle 40 is exchangeably provided in the bottom part 35 and this nozzle is provided with an outlet opening 41, which adjoins an outlet duct 43. Connections 45 and 47 serve for the circulation of warm water through the circulation chamber 33. The closure part 37 comprises a cylindrical wall portion 49 and a wall portion 51 extending in the transverse direction, which portions enclose a space 50, while this closure part is secured on the housing 31 by means of a screw connection 53. A tubular member 55 is exchangeably secured centrally in the wall portion 51 and this member has a restricted inlet opening 57 and a guide duct 59. The transverse wall 51 closes a pressure chamber 61. A connection 63 serves for the supply under pressure of coating material to the pressure chamber 61. An outlet opening 65 acts as an overflow and serves to drain any overflowing coating material. A further supply opening 67 for the supply of a flushing gas is provided in the wall portion 49. A cover 69 with a closure wall 71 provided with a central passage opening 73 and with connections 75 serves for the forced draining of the flushing gas by means of a suction system not shown further. All parts except the tubular member 55 and the closure wall 71 are made of stainless steel. The parts which get into contact with the coating material are polished and are constructed without sharp edges or dead angles. The tubular member 55 is elastically deformable and is preferably made of polytetrafluoroethylene. At the level of the inlet opening 57, an adjustment block 77 is secured on the tubular member 55. There are mounted in the cylindrical wall 49 two adjustment screws 79 which are arranged at right angles to each other and are provided with disks or wheels 81 cooperating with rectilinear guide grooves 83 in the adjustment block 77. The closure wall 71 is made of glass in order to permit observation of the surroundings of the inlet opening 57 with the naked eye.

FIG. 4 shows diagrammatically besides the coating device 11 the necessary means for supplying the coating material and the flushing gas and for the circulation of the water in the circulation chamber 33. Reference numeral 85 denotes a supply vessel, in which a given quantity of coating material is stored under pressure and at a given temperature. A pressure regulation device is designated by reference numeral 87. The coating material is heated to a given temperature by means of warm water, the supply of which is regulated by means of a water thermostat 89. During heating of the coating material, degasing also takes place so that the air bubbles disappear therefrom. Reference numeral 91 denotes a further water thermostat which regulates the supply of warm water to the circulation chamber 33. The flushing gas of low kinematic viscosity is present under pressure in a gas flask 93. The flow rate of the gas is measured and adjusted by means of the flow meter 95. The further elements shown diagrammatically have already been described above.

For starting the arrangement described for coating an optical fibre F of 125 μm diameter, first there is drawn from the preform P at a comparatively low draw speed a fibre having a diameter which decreases gradually until the fibre diameter is about 125 μm. The fibre F is then broken and is again threaded through the coating device 11 and the curing device 15 and is fixed on the reel 21. Subsequently, the drawing process is continued; the curing device 15 is made operative and coating material C. i.e. a UV-curing acrylate, is pressed through the connection 63 to the pressure chamber 61 from the supply vessel 85, in which it is held at a temperature of 65° to 70° C. A temperature of 45° to 50° C. is maintained in the circulation chamber 33 by means of the heating circuit and at this temperature the coating material has a dynamic viscosity of 1.3 Pa.s. From the pressure chamber 61, the coating material C is pressed in part through the outlet duct 43 to the outlet opening 41 in the nozzle 40; along this trajectory, the coating material is absorbed by the fibre F. Another part of the coating material is pressed from the pressure chamber 61 through the guide duct 59 to the inlet opening 57. In the beginning, when coating material is supplied to the coating device 11, many air bubbles are formed in the coating material. During the gradual increase of the draw speed to the ultimately desired value, an excess of coating material is supplied, which is drained via the guide duct 59, the inlet opening 57, the space 50 and finally the overflow 65. As a result, the coating device 11 is flushed and the bubbles formed in the beginning stage are removed from the system. With increasing draw speed, the pressure on the coating material is increased. When the desired draw speed is attained, the pressure on the coating material in the supply vessel 85 is adjusted to such a value that the coating material forms on the inlet opening 57 a convex surface D. The formation of this surface is facilitated in that the tubular member is made of polytetrafluoroethylene. During the further process, this situation remains stable and stationary. No circulation of coating material and no bubble formation take place in the restricted inlet opening 57 and in the adjoining part of the guide duct 59. It has been found that due to these measures at a draw speed up to about 150 m/min a coating can be applied to the fibre without occlusion of bubbles.

An absolutely bubble-free coating can also be applied to fibres at draw speeds of 180 m/min and higher by a further measure, that is to say by maintaining in the environment of the inlet opening 57 and of the spherical surface D a gas atmosphere of a gas having a kinematic viscosity lower than that of air. This gas is supplied via the gas supply 67, flows into the space 50, flushes the inlet opening 57 and the convex surface D of the coating material and leaves the space 50 via the central passage 73 in the cover 69. Through the gas drains 75, this gas can be drained again.

In the following table some suitable gases are indicated.

| gas | $\nu$ | R |
|---|---|---|
| air | 14.8 | 1 |
| Ar | 12.3 | 0,83 |
| Xe | 3.8 | 0,26 |
| *C Cl$_2$F$_2$ | 2.3 | 0,15 |

(*C Cl$_2$F$_2$ = dichlorodifluoromethane).

In this case:

$\nu$ = the kinematic viscosity in $10^{-6}$ m$^2$/S at 20° C.;
R = the ratio ($\nu$gas/$\nu$air).

The draw speed at which a fibre can be coated without bubbles being formed can be increased by a factor 4 to 5 up to a speed of 700 m/min by using a gas whose kinematic viscosity is only 15% of that of air, i.e. dichlorodifluoromethane.

All parts of the drawing equipment 1 are arranged accurately in line along a common centre line H—H, with which the centre line of the fibre F coincides, in order to obtain a radial-symmetrical influencing of the fibre, i.e. heating, cooling and curing. The coating should also be applied coaxially or concentrically with respect to the fibre, in other words: the thickness of the coating should be constant, viewed along the circumference of the fibre. A fibre with a non-concentric coating is subjected to non-concentric asymmetrical forces during cooling or heating. These asymmetrical forces are due to unequal expansion coefficients of fibre material and coating material and may result in undesired variations of the optical properties of the fibre.

The concentric location of fibre and coating is continuously measured by means of the control device 13. An error in the concentricity can be readjusted or eliminated in a simple manner in the arrangement according to the invention by simple adjusting the elastically deformable tubular member 55, which is made of polytetrafluoroethylene, by means of the adjustment screws 79. As a result, the restricted inlet opening 57 can be centred or adjusted in such a manner that the coating is again located concentrically around the fibre. Further adjustments or readjustments are not required. The position of the nozzle 40 with the outlet opening remains unchanged, i.e. in line with and coaxial to the centre line H—H of the equipment.

Figure 5:
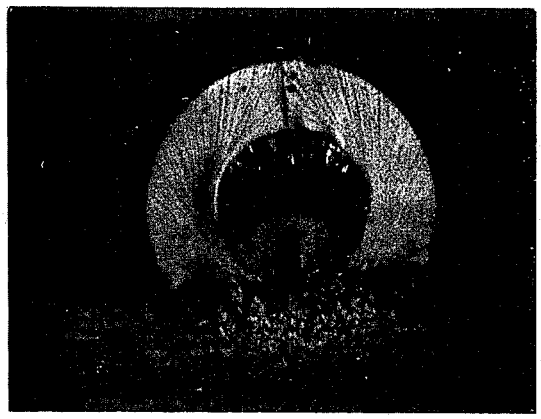
FIG. 5 shows a photographic enlargement of an optical fibre coated by means of the method according to the invention on a scale of 200:1.

FIG. 5 shows a photographic enlargement (200 times) of the rupture surface of a fibre F having a diameter of 125 μm provided with a coating C having a layer thickness of 60 μm applied by the arrangement according to the invention at a draw speed of 700 m/min and with the use of C Cl$_2$F$_2$ as flushing gas. The coating C is arranged concentrically with respect to the fibre F and has a substantially uniform layer thickness with deviations of ±2 μm. The result has proved to be reproducible over great lengths, i.e. over lengths of kilometers.

Experiments have shown that a restricted inlet opening having a diameter of 0.9 to 1.1 mm and a length of 2 mm is suitable for draw speeds up to 700 m/min. The guide duct 59 had a length of 30 mm and a diameter of 2 mm. A pressure of 300 kPa was maintained in the supply vessel. For coating a fibre having an original diameter of 125 μm to a diameter of 250 μm inclusive of coating, use was made of a nozzle 40, whose outlet opening had a diameter of 350 μm and a length of 3 mm.

The layer thickness of the coating is determined in the first instance by the dimensions of the outlet opening 41 in the nozzle 40. However, the layer thickness is also influenced by the temperature and hence by the dynamic viscosity of the coating material present in the pressure chamber 61. It has been found that the layer thickness can be controlled in an effective and simple manner by an accurate regulation of the temperature and hence of the dynamic viscosity of the coating material in the pressure chamber 61 by circulation of warm water in the circulation chamber 33. In the case of deviations from the desired layer thickness of the coating, the temperature and hence the dynamic viscosity of the coating material in the pressure chamber 61 are readjusted so that the desired thickness is again obtained and maintained.

The said draw speed of 700 m/min was the highest draw speed admitted by the drawing equipment available. In view of the particular results and the extraordinary effects, it is probable that even higher speeds are possible.

In the embodiment described, the spindles 79 are operated by hand. Of course it is also possible to operate the spindles automatically under the control of the control device 13. In a similar manner, the layer thickness can be automatically adjusted via the measurement device 17.

What is claimed is:

1. An arrangement for coating a fiber comprising:
   (a) a housing provided with a sidewall portion, a bottom wall portion essentially transverse to said sidewall portion, and including a pressure chamber for providing liquid coating under pressure on a fiber passing through said pressure chamber;
   (b) a closure member transverse to, and cooperating with, the sidewall portion of said housing for closing the upper side of said pressure chamber and comprising a guide duct with an inlet opening for the supply and guidance of a fiber to be coated by liquid coating in said pressure chamber;
   (c) a supply opening situated in a wall of said housing for supplying said liquid coating to said pressure chamber;
   (d) an overflow opening for said liquid coating material situated in the sidewall portion of said housing, and
   (e) a nozzle situated in the bottom wall portion of said housing and provided with an opening, coaxial with said guide duct and in communication with said pressure chamber,
   characterized in that said guide duct is provided in a tubular guide member secured in said closure member and having a free end adjustable in the radial direction.

2. An arrangement as claimed in claim 1, characterized in that the inlet opening of the guide duct is restricted.

3. An arrangement as claimed in claim 2, characterized in that the tubular guide member is made of an elastically deformable material.

4. An arrangement as claimed in claim 2, characterized in that the nozzle is in communication with the pressure chamber via a narrowed outlet duct.

5. An arrangement as claimed in claim 1, characterized in that the tubular guide member is made of an elastically deformable material.

6. An arrangement as claimed in claim 5, characterized in that the tubular guide member is made of polytetrafluoroethylene.

7. An arrangement as claimed in claim 1, characterized in that there is arranged on the free end of the tubular guide member an adjustment block provided with two guide grooves which are arranged at right angles to each other and cooperate with two disk-shaped members arranged on the ends of two spindles which are arranged at right angles to each other and are adjustable by means of a screw connection in the wall of the housing.

8. An arrangement as claimed in claim 1, characterized in that the nozzle is in communication with the pressure chamber via a narrowed outlet duct.

9. An arrangement as claimed in claim 1, characterized in that the housing has a circulation chamber which surrounds the part of the pressure chamber facing the outlet opening.

* * * * *